United States Patent
Johansson et al.

(10) Patent No.: US 12,256,363 B2
(45) Date of Patent: *Mar. 18, 2025

(54) USER EQUIPMENT TRACKING AND PAGING AREA SELECTION IN WIRELESS COMMUNICATION SYSTEMS

(71) Applicant: Telefonaktiebolaget LM Ericsson (publ), Stockholm (SE)

(72) Inventors: Åke Johansson, Pixbo (SE); Gang Sun, Hovås (SE); Jesper Derehag, Kareby (SE); Magnus Norlander, Gothenburg (SE); Mona Matti, Nacka (SE); Jaesong Jeong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,971

(22) Filed: Oct. 9, 2023

(65) Prior Publication Data

US 2024/0040544 A1   Feb. 1, 2024

Related U.S. Application Data

(63) Continuation of application No. 17/299,941, filed as application No. PCT/EP2018/083955 on Dec. 7, 2018, now Pat. No. 11,818,684.

(51) Int. Cl.
*H04W 68/00* (2009.01)
*H04W 36/32* (2009.01)
*H04W 60/04* (2009.01)

(52) U.S. Cl.
CPC ......... *H04W 68/005* (2013.01); *H04W 60/04* (2013.01); *H04W 36/322* (2023.05)

(58) Field of Classification Search
CPC ......... H04W 68/005; H04W 36/00835; H04W 36/08; H04W 36/32; H04W 60/04; H04W 68/02

(Continued)

(56) References Cited

U.S. PATENT DOCUMENTS 9,167,555 B2   10/2015   Liu et al.
9,668,180 B1 *   5/2017   Vivanco .......... H04W 36/00835

(Continued)

FOREIGN PATENT DOCUMENTS

CN   104471996 A   3/2015
CN   107852643 A   3/2018

(Continued)

OTHER PUBLICATIONS

Office Action for Chinese Patent Application No. 201880100022.1 dated Nov. 4, 2023, 7 pages.

(Continued)

*Primary Examiner* — Michael Y Mapa
(74) *Attorney, Agent, or Firm* — Sage Patent Group

(57) ABSTRACT

A method of predicting a location of a user equipment, UE, in a mobile communication network includes generating a list of potential target base stations by generating a transition count for each potential target base station including a count of transitions from the base station to the potential target base station within a predetermined time period, generating a plurality of relative transition frequencies based on the transition counts, and generating a transition probability for each respective potential target base station based on the relative transition frequency of the potential target base station from the base station.

18 Claims, 11 Drawing Sheets

(58) Field of Classification Search
USPC ...... 370/329, 331; 455/436–445, 450–452.1, 455/456.1–458
See application file for complete search history.

(56) References Cited

U.S. PATENT DOCUMENTS

| | | | |
|---|---|---|---|
| 9,844,024 B2 | 12/2017 | Kollar et al. | |
| 2003/0190916 A1 | 10/2003 | Celedon et al. | |
| 2008/0102789 A1 | 5/2008 | Sung | |
| 2011/0294524 A1 | 12/2011 | Tontinuttananon et al. | |
| 2012/0100871 A1* | 4/2012 | Zhao | H04W 68/04 455/456.1 |
| 2013/0170347 A1* | 7/2013 | Zhang | H04W 76/18 370/331 |
| 2013/0272132 A1* | 10/2013 | Heo | H04W 74/0833 370/236.2 |
| 2013/0316706 A1* | 11/2013 | Knauft | H04W 68/04 455/458 |
| 2014/0155109 A1 | 6/2014 | Vaidya et al. | |
| 2014/0219109 A1 | 8/2014 | Shukair et al. | |
| 2015/0038180 A1 | 2/2015 | Quick, Jr. et al. | |
| 2015/0163637 A1 | 6/2015 | Castmo | |
| 2018/0220330 A1 | 8/2018 | Van Der Velde et al. | |
| 2018/0279118 A1 | 9/2018 | Xu et al. | |

FOREIGN PATENT DOCUMENTS

| | | |
|---|---|---|
| EP | 3046382 A1 | 7/2016 |
| EP | 3065477 A1 | 9/2016 |

OTHER PUBLICATIONS

International Search Report and Written Opinion of the International Searching Authority, PCT/EP2018/083955, mailed Sep. 18, 2019, 17 pages.

\* cited by examiner

Destination eNBs

| | eNB 1 | eNB 2 | eNB 3 | eNB 4 |
|---|---|---|---|---|
| eNB 1 | - | N=3, t=7 | N=10, t=56 | N=13, t=40 |
| eNB 2 | N=54, t=56 | - | N=65, t=321 | N=3, t=32 |
| eNB 3 | N=1, t=5 | N=12, t=43 | - | N=4, t=4 |
| eNB 4 | n=65, t=3 | N=34, t=21 | N=44, t=22 | - |

Source eNBs

USER EQUIPMENT TRACKING AND PAGING AREA SELECTION IN WIRELESS COMMUNICATION SYSTEMS

CROSS REFERENCE TO RELATED APPLICATIONS

This application claims priority to U.S. patent application Ser. No. 17/299,941, filed Jun. 4, 2021, which a 35 U.S.C. § 371 national stage application of PCT International Patent Application No. PCT/EP2018/083955 filed on Dec. 7, 2018, the disclosures and contents of which are incorporated by reference herein in their entirety.

TECHNICAL FIELD

The inventive concepts relate to wireless communication networks, and in particular to tracking the location of user equipment (UE) units within a wireless communications network.

BACKGROUND

The Long Term Evolution (LTE) wireless communication specification defines a Tracking Area (TA) as a coarse means to track the location of user equipment (UE) locations that are in idle mode. A TA consists of a base station or group of base stations (eNodeBs/eNBs in LTE systems, or gNodeBs/gNBs in New Radio (NR) systems) having the same Tracking Area Code (TAC). TA information is used by the Mobility Management Entity (MME) in the core network when paging idle UEs to notify them of incoming data connections.

FIG. 1 illustrates a service area 100 of a wireless communication system and FIG. 2 is a block diagram illustrating some elements of the wireless communication system. Referring to FIG. 1, the service area 100 is generally divided into a plurality of cells 110, each of which is served by a base station (e.g., an eNodeB/gNodeB or radio unit). A single base station may serve a plurality of cells. The area served by a single base station is referred to herein as a "base station coverage area." In the following example, it is assumed that each base station serves a single cell. However, it will be appreciated that a base station coverage area may include one or more cells of the wireless communication system.

A user equipment (UE) 220 operating within the service area 100 may move from cell to cell within the service area 100. When the UE 220 moves from one cell to an adjacent cell, the network may perform a handover of the connection with the UE 220 from one base station to another base station. The service area 100 shown in FIG. 1 is divided into two TAs 120A (the unshaded cells) and 120B (the shaded cells), each of which comprises a plurality of cells 110.

FIG. 2 illustrates a tracking area 120 including a plurality of eNBs/gNBs 210A to 210N and a UE 220 in a cell 110 served by eNB/gNB 210B. An MME 200 communicates with the eNB/gNBs 210 to facilitate mobility of the UE 220 within the network.

If the UE 220 moves out of a TA, the UE 220 must signal the departure to the network and perform a TA Update (TAU). This is done so the network can update the area in which to page the UE in case downlink data is received for the UE while it is in idle mode. Otherwise, the MME 200 would have to page the entire network to locate the UE 220, which would consume time and network resources.

For LTE evolved packet core (EPC) systems, the standards 3GPP TS23.401 and TS24.301 enable an MME 200 to send a list of TAs (a TA list) to the UE 220 during a TA Update in which a UE 220 may roam without performing a Tracking Area Update. When the MME 200 pages a UE 220, a paging message is sent to all base stations associated with the TA list. When the UE 220 performs a TAU, the MME 200 typically returns an updated TA list to the UE 220.

SUMMARY

A method of predicting a location of a user equipment, UE, in a mobile communication network having a plurality of base stations serving respective base station coverage areas includes, for each base station in the mobile communication network, generating a list of potential target base stations for the base station, the list of potential target base stations for the base station including base stations to which a transition from the base station occurs within a predetermined time period, wherein generating the list of potential target base stations includes generating a transition count for each potential target base station, the transition count including a count of transitions from the base station to the potential target base station within the predetermined time period, generating a plurality of relative transition frequencies based on the transition counts, each of the relative transition frequencies corresponding to one of the potential target base stations and describing a relative frequency of transitions from the base station to the corresponding potential target base station during the predetermined time period, generating a transition probability for each respective potential target base station based on the relative transition frequency of the potential target base station from the base station, comparing transition counts for each of the potential target base stations to a first threshold, and in response to the transition count for one of the potential target base stations being less than the first threshold, removing the one of the potential target base stations from the list of potential target base stations for the base station. In some embodiments, other network messages sent to or received from a UE may be used The method may further include comparing transition counts for each of the potential target base stations to a second threshold, and in response to determining that any of the transition counts for the potential target base stations is greater than the second threshold, multiplying each of the transition counts by a scaling factor.

The scaling factor may be one half and wherein the first threshold may be one.

The second threshold may be selected to constrain a length of the list of potential target base stations for each base station to a predetermined maximum length.

The method may further include providing a set of event based monitoring, EBM, data describing a plurality of events in the mobile communication network, selecting a threshold value for the first threshold, repeatedly performing operations of analyzing the EBM data to determine a total number of paging messages that would be required to successfully locate all UEs paged in the EBM data using the selected value of the first threshold, and changing the threshold value of the first threshold, and selecting a threshold value that requires a lowest number of paging messages to successfully locate all UEs paged in the EBM data.

The method may further include determining a target paging confidence interval for a paging list for the UE, the request including an identity of a last known base station to which the UE was connected, and assembling the paging list by selecting a plurality of potential target base stations from the list of potential target base stations of the last known base station based on the target paging confidence interval and the transition probabilities for each of the potential target base stations in the list of potential target base stations for last known base station.

A sum of the transition probabilities of the selected potential target base stations may be greater than or equal to the desired paging confidence level.

Comparing transition counts for each of the potential target base stations to the first threshold and removing potential target base stations from the list of potential target base stations in response to the comparison may be performed at predetermined time intervals.

The method may further include removing a first potential target base station from the list of potential target base stations for each base station when the first potential target base station is deactivated from the mobile communication network.

A network node in a mobile communication network according to some embodiments includes a processor circuit, transceiver coupled to the processor circuit, and a memory coupled to the processor circuit. The memory includes machine readable computer program instructions that, when executed by the processor circuit, cause the network node to perform operations of for each base station in the mobile communication network, generating a list of potential target base stations for the base station, the list of potential target base stations for the base station including base stations to which a transition from the base station occurs within a predetermined time period, wherein generating the list of potential target base stations includes generating a transition count for each potential target base station, the transition count including a count of transitions from the base station to the potential target base station within the predetermined time period, generating a plurality of relative transition frequencies based on the transition counts, each of the relative transition frequencies corresponding to one of the potential target base stations and describing a relative frequency of transitions from the base station to the corresponding potential target base station during the predetermined time period, generating a transition probability for each respective potential target base station based on the relative transition frequency of the potential target base station from the base station, comparing transition counts for each of the potential target base stations to a first threshold, and in response to the transition count for one of the potential target base stations being less than the first threshold, removing the one of the potential target base stations from the list of potential target base stations for the base station. The network node may be an MME.

A method of generating a synthetic geographic map of network nodes in a mobile communication system includes assigning each network node in the mobile communication system to a node of a graph, forming an edge between each pair of nodes of the graph corresponding to a pair of base stations that participate in a transition of a user equipment, UE, from one of the pair of network nodes to the other of the pair of network nodes during a predetermined time period, assigning an edge weight to each edge, wherein the edge weight for an edge is based on a dwell time prior to transition for each UE that is subject to a transition between the network nodes in the pair of network nodes corresponding to the edge, arranging the nodes of the graph according to a geographic distribution based on the edge weights, and generating synthetic geographic coordinates for the nodes of the graph based on the geographic distribution.

The method may further include assigning a node weight to each node in the graph based on a total number of transitions involving the node in the graph.

The method may further include assigning a color to each node in the graph based on the node weight of the node in the graph, and displaying the graph as a heat map with each node in the graph shown in its assigned color.

The method may further include assigning a color to each node in the graph based on a tracking area to which the base station associated with the node in the graph belongs, and displaying the graph with each node in the graph shown in its assigned color.

The method may further include identifying a node in the graph belonging to a first tracking area that does not have an edge with any other node in the first tracking area, and moving the node in the graph to a second tracking area in which the node has an edge with at least one other node.

The dwell time prior to transition for a UE relative to the pair of network nodes corresponding to the edge includes a time difference between a time when the UE was handed over to one of the pair of network nodes to a time when the UE was handed over from the one of the pair of network nodes to the other of the pair of network nodes.

The edge weight may be based on an average dwell time for all UEs involved in a transition between the pair of network nodes.

A distribution of dwell times of UEs involved in a transition between the pair of network nodes may include a plurality of modes, and wherein the edge weight may be based on a selected one of the plurality of modes of the distribution.

The edge weight may be based on a minimum dwell time for all UEs involved in a transition between the pair of network nodes.

The edge weight may be based on a maximum dwell time for all UEs involved in a transition between the pair of network nodes.

Arranging the nodes of the graph according to a geographic distribution based on the edge weights may include applying a force directed graph drawing algorithm to the nodes based on the edge weights.

Arranging the nodes of the graph according to a geographic distribution based on the edge weights may include applying a force-directed graph drawing algorithm, such as a Kamada-Kawai algorithm, to the nodes based on the edge weights.

Arranging the nodes of the graph according to a geographic distribution based on the edge weights may include applying a T-distributed Stochastic Neighbor Embedding algorithm to the nodes based on the edge weights.

The method may further include obtaining a transition timestamp for a transition of a user equipment, UE, to a coverage area served by a network node, and using the synthetic geographic coordinates of the node of the graph corresponding to the network node to estimate position and/or velocity of the UE.

The method may further include using the estimated position and/or velocity of the UE to predict a second network node to which the UE will be handed over by the network node.

A network node according to some embodiments includes a processor circuit, a network interface coupled to the processor circuit, and a memory coupled to the processor circuit, wherein the memory includes machine readable computer program instructions that, when executed by the processor circuit, cause the computer server to perform operations of assigning each network node in the mobile communication system to a node of a graph, forming an edge between each pair of nodes of the graph corresponding to a pair of base stations that participate in a transition of a user equipment, UE, from one of the pair of network nodes to the other of the pair of network nodes during a predetermined time period, assigning an edge weight to each edge, wherein the edge weight for an edge is based on a dwell time prior to transition for each UE that is subject to a transition between the network nodes in the pair of network nodes corresponding to the edge, arranging the nodes of the graph according to a geographic distribution based on the edge weights, and generating synthetic geographic coordinates for the nodes of the graph based on the geographic distribution. The network node may include an MME.

Some embodiments provide system modeling and machine learning techniques that can reduce the average number of paging messages needed to locate an idle UE. Reducing the number of paging messages in a network can save network resources, such as backhaul and air interface bandwidth, which may result in cost and energy savings as well as overall network efficiency and quality of service.

BRIEF DESCRIPTION OF THE DRAWINGS

The accompanying drawings, which are included to provide a further understanding of the inventive concepts and are incorporated in and constitute a part of this application, illustrate certain embodiment(s) of the inventive concepts. In the drawings.

DESCRIPTION OF EMBODIMENTS

Figure 1:
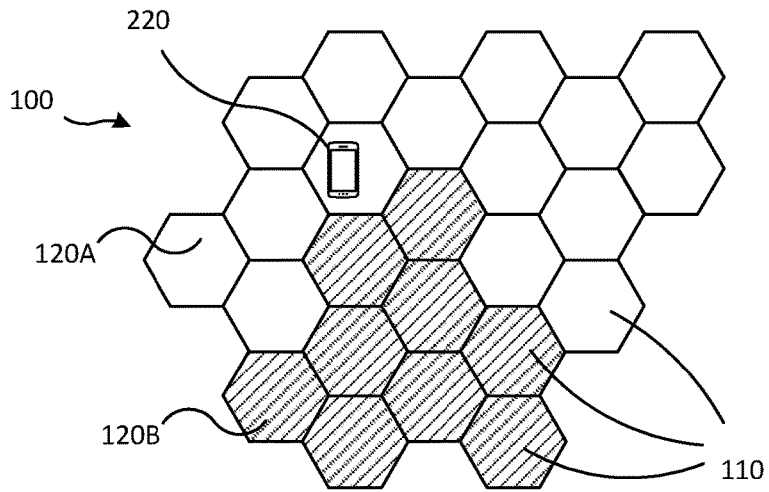
FIG. 1 is a diagram that illustrates a cellular wireless communication network coverage area.
Figure 2:
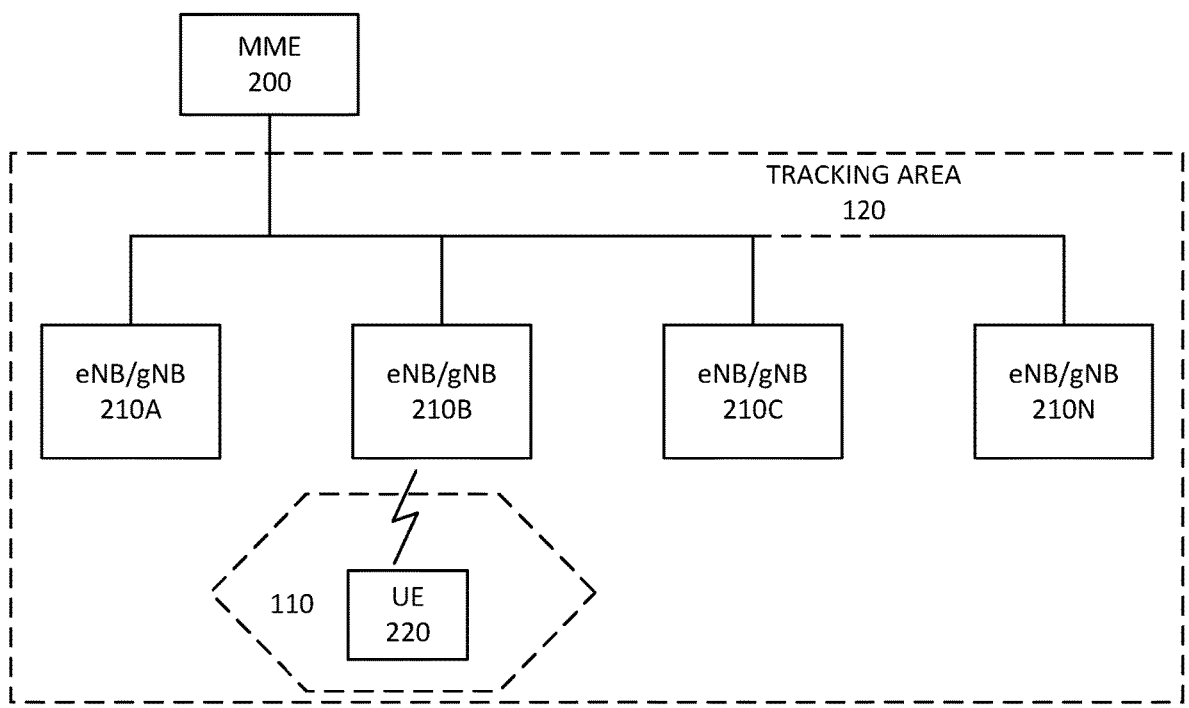
FIG. 2 is a block diagram that illustrates elements of a cellular wireless communication network coverage area.

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the inventive concepts belongs. It will be further understood that terms used herein should be interpreted as having a meaning that is consistent with their meaning in the context of this specification and the relevant art and will not be interpreted in an idealized or overly formal sense unless expressly so defined herein. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As noted above, when a network wishes to page an idle UE, the MME may request each base station in a UE's tracking area to page the UE by sending a paging message and listening for a response from the UE. If the UE fails to respond to paging signals within its tracking area, the network may page a broader area in an attempt to locate the UE. Paging can use a significant amount of network resources. Thus, it is desirable to locate a UE as quickly as possible with as few re-tries as possible and with as few paging messages as possible. To increase the probability of locating a UE in the first paging attempt, it is desirable to make tracking areas large, or to make a UE's tracking area list large. However, when the size of a tracking area or tracking area list is increased, the number of paging messages that must be sent in each paging attempt is also increased, which can consume network resources and reduce network performance.

To address this, so-called smart or adaptive paging techniques have been developed. For example, in one approach, when a UE in mode idle is to be reached, the network may first page the UE at the last eNodeB to which it was connected. If the UE does not respond, the network may page the UE using a list of last eNodeBs visited by the UE, and then by paging the UE in the UE's tracking area. While such techniques can reduce the average number of paging messages needed to reach an idle UE, these techniques may nevertheless consume unnecessary system resources.

Some embodiments provide systems/methods for predicting the location of an idle UE based on past network data. In some embodiments, the prediction can be used to generate a paging list of base stations that can be instructed to page the UE with a high level of confidence that the UE will be located. In particular, some embodiments provide system modeling and machine learning techniques that can reduce the average number of paging messages needed to locate an idle UE. Reducing the number of paging messages in a network can save network resources, such as backhaul and air interface bandwidth, which may result in cost and energy savings as well as overall network efficiency and quality of service.

Figure 3:
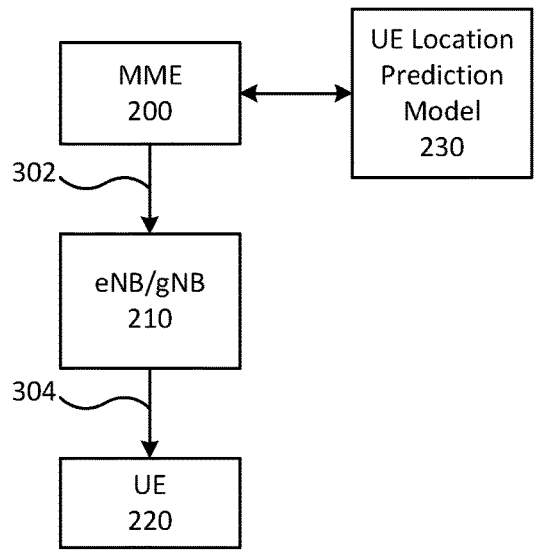
FIG. 3 is a block diagram that illustrates a system for tracking the location of user equipment in a wireless communication network according to some embodiments.
Figure 4:
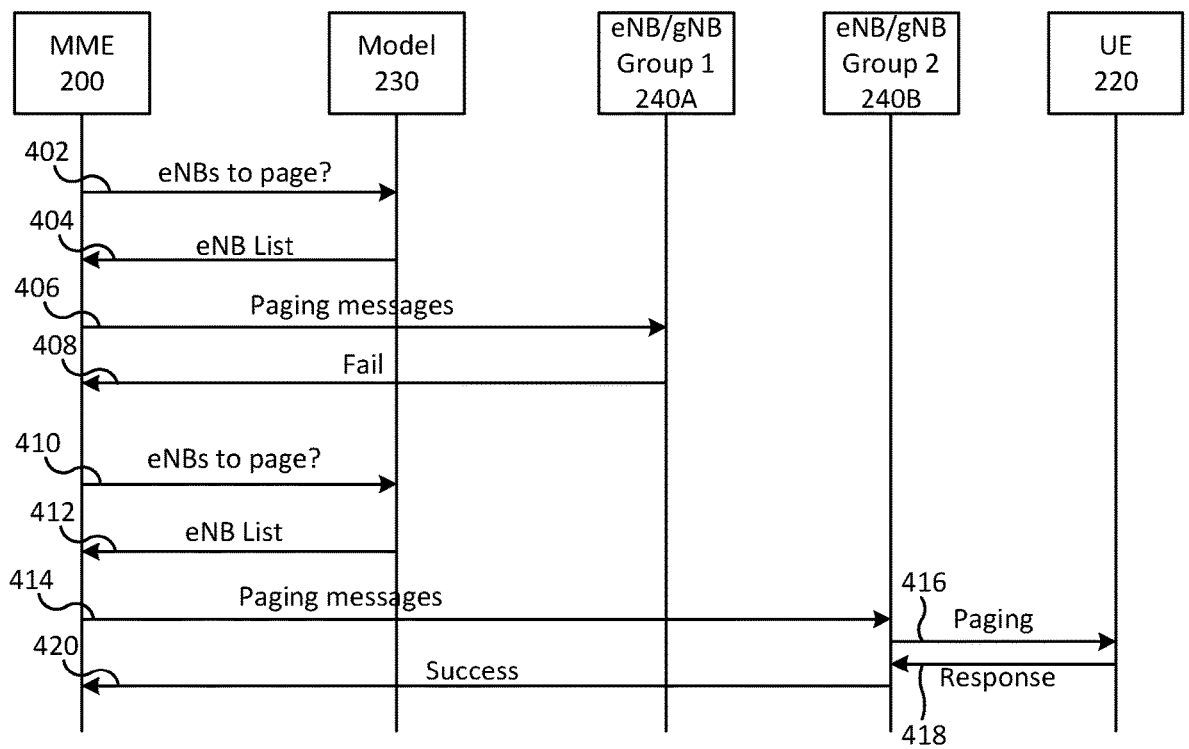
FIG. 4 is a flow diagram that illustrates a paging operation in a wireless communication network according to some embodiments.

FIG. 3 is a block diagram and FIG. 4 is a flow diagram that illustrate a system for tracking the location of user equipment in a wireless communication network according to some embodiments. Referring to FIG. 3, a network node, such as an MME 200 uses a UE location prediction model 230 to generate a prediction of a location of a UE 220, such as an idle UE that the MME 200 desires to page. Based on the location prediction, the MME 200 sends a paging request 302 to an eNB/gNB 210, which transmits a paging message 304 to the UE 220.

FIG. 4 illustrates a paging operation in a wireless communication network according to some embodiments in which the initial paging attempt is unsuccessful. As shown therein, the MME 200 queries the model 230 to obtain a list of base stations to page in a first UE paging list request 402. The request 402 may include a confidence level requirement that indicates a desired level of confidence that the paging attempt will be successful (e.g., 95%). In some embodiments, the desired confidence level may be set by the network or by configuration.

The model 230 responds with a paging list 404 containing a list of base stations (Group 1) that the MME 200 should page. The paging list may be generated based on the desired confidence level. The MME 200 then sends paging requests 406 to each base station in the paging list (i.e., to each base station in Group 1). In this example, the first paging attempt fails, so each base station in Group 1 returns a failure message 408 to the MME 200. The MME 200 then sends a second request 410 to the model 230 for an updated paging list. The second request may include an updated confidence level requirement that is greater than the first confidence level requirement (e.g., 99%). The model 230 responds with an updated paging list 412 that is selected to meet the updated confidence level requirement. The updated paging list may include base stations in a second group (Group 2) that may include or exclude base stations included in the first paging list.

The MME 200 then sends paging requests 414 to each base station in the updated paging list. The base station that serves the cell in which the UE is currently located sends a paging request 416 that is received by the UE 220, and the UE 220 responds with a paging response 418. The base station to which the UE 220 responded then sends a message 420 back to the MME 200 indicating the current location of the UE 220.

Figure 5:
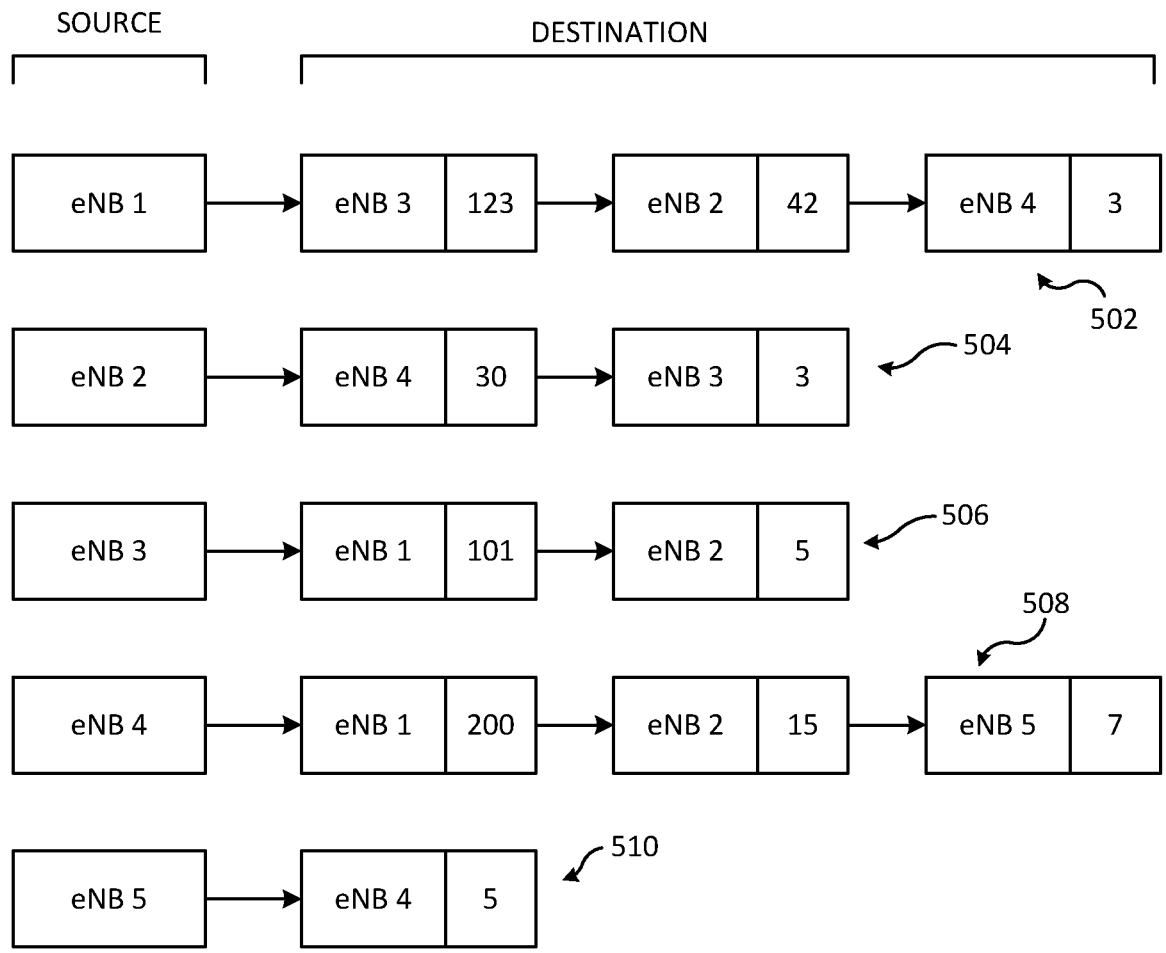
FIG. 5 is a block diagram illustrates a technique for generating a paging list in a wireless communication network according to some embodiments.

FIG. 5 is a block diagram illustrates a technique for generating a paging list in a wireless communication network according to some embodiments. The example illustrated in FIG. 5 uses a Hidden Markov Model to predict the current location of a UE, such as a UE in idle mode whose location is unknown. A Hidden Markov Model is a statistical Markov model in which the system being modeled is assumed to be a Markov process with unobserved (i.e. hidden) states. A Markov process is a stochastic model describing a sequence of possible events in which the probability of each event depends only on the state attained in the previous event. A sequence of states that follows a Markov process is known as a Markov chain. As applied to the generation of a paging list, the output of the system is the paging location of a UE, i.e., the identity of the base station coverage area where the UE can be found via paging. The sequence of paging locations of a UE may be modeled using a Markov chain.

In simple Markov models, such as Markov chains, the state of the system is directly visible to the observer, and therefore the state transition probabilities are the only parameters. In a hidden Markov model, the state of the system is not directly visible, but the output of the system, which is dependent on the state, is visible. Each state has a probability distribution over the possible outputs. Therefore, the sequence of outputs generated by a Hidden Markov Model provides information about the sequence of states. As applied to the paging location of a UE, the exact state of the UE at any given moment may not be known to the system, but the output of the system, i.e., the paging location of the UE, may be known or discoverable by the system.

FIG. 5 illustrates a plurality of source base stations (eNB1, eNB2, eNB3 and enB4). Associated with each source base is a list 502 to 510 of potential destination base stations (a "likely neighbour list"). In particular, as illustrated in FIG. 5, for each source base station in a mobile communication network, a list of likely destination base stations is generated. Each of the destination base stations in the likely neighbour list represents a base station to which the UE is likely to move and obtain service. In some cases, the destination base station is a base station to which the source base station is likely to hand over a call. However, there may not be an explicit handover from one base station to another. For example, a UE may transition from one base station to another by entering into idle mode after being connected to a first base station, moving to the service area of a second base station, and then sending a message, such as a service request, to the second base station. Even though there has been no explicit handover from the first base station to the second base station, the UE has transitioned from the first base station to the second base station.

A transition also occurs when a UE sends a message, such as a service request message, to one base station and then another message to a different base station. For example, an active UE that is connected to a first eNB (eNB1) may become idle. The next time the network hears from the UE may be via a message to a second eNB (eNB2). In that case, some embodiments register a transition from eNB1 to eNB2.

For example, if a UE sends messages to the following eNBs in sequence [eNB1, eNB2, eNB3, eNB4, eNB5] the system would register the following transitions

[eNB1→eNB2, eNB2→eNB3, eNB3→eNB4, eNB4→eNB5]. Some embodiments may only register a transition based on specific types of messages, such as service requests. For example, if only service requests are used and the only service request was at node 4, then the system may only register a transition of eNB3→eNB4.

As a further example, assume there is a road passing through the coverage areas of a number of eNBs, such as eNB1→eNB2→eNB3→eNB4. Assume further that a car with a UE inside is driving on the road and the last eNB the UE was connected to was eNB1. If the UE enters idle state, and only handovers are used to generate edges, the algorithm may predict that the car was located at eNB2. However, since the car may move fast, the UE may have likely moved further, perhaps to the coverage area of eNB4. If Service Request messages are used to generate the graph, there would most likely be a transition from eNB1 to eNB4, enabling the system to more accurately predict the probable location of the UE.

For example, in FIG. 5, the likely neighbour list 502 associated with source destination eNB1 includes three potential destination base stations to which a UE is likely to transition from eNB1, namely, eNB3, eNB2, eNB4 and eNB5.

In addition, each destination base station in the likely neighbour list includes an associated transition metric that represents a likelihood that a given transition from the source base station will be to that destination base station. The transition metric may be used to ensure that a paging list generated using the model meets a desired paging confidence level requirement. For example, in FIG. 5, with respect to source eNB1, destination base station eNB3 has a transition metric of 123, destination base station eNB2 has a transition metric of 42, and destination base station eNB4 has a transition metric of 3.

The transition metric for a given destination base station may vary based on the source base station to which it relates. For example, the transition metric for eNB2 is 42 with respect to source base station eNB1, 5 with respect to source base station eNB3 and 15 with respect to source base station eNB4.

The likely neighbour lists for the source base stations may be generated/updated by the MME 200 as follows. Each time a transition occurs in the mobile communication system, the MME 200 updates the likely neighbour list associated with the source base station involved in the transition by first checking to see if the destination base station involved in the transition is already on the likely neighbour list for the source base station. If not, the destination base station is added to the list and the metric associated with the destination base station is set at one. If the destination base station is already on the likely neighbour list for the source base station, the metric associated with the destination base station is incremented by one. Accordingly, in some embodiments, the metric for a given source/destination base station pair may be a counter that is incremented each time a transition occurs from the source base station to the destination base station. Accordingly, in some embodiments, the metric may be referred to as a "transition count." As noted above, the transition may be an explicit handover of the UE from one base station to another or an implicit transition that occurs when a UE that was connected to one base station sends a message, such as a service request to another base station.

The likely neighbour list for each source base station is sorted in descending order according to the metric. Accordingly, the more transitions that have occurred from the source base station to a destination base station, the higher the destination base station will be on the likely neighbour list of the source base station.

According to some embodiments, the likely neighbour list for a source base station may be adaptive. In particular, the list may be adapted to more heavily weight recent activity in the network to account for changing network conditions and demands. In some embodiments, adapting the likely neighbour list may save memory and/or storage space at the MME 200 by eliminating stale entries. The likely neighbour list may be adapted in some cases by scaling the transition counts of the destination base stations in the list and filtering the list based on the scaled transition counts.

For example, in some embodiments, an upper threshold may be established. Each time a transition occurs from a source base station and the transition count of a destination base station in the likely neighbour list is incremented, the updated transition count may be compared to the upper threshold. If the updated transition count equals or exceeds the upper threshold, the transition counts of all destination base stations in the likely neighbour list may be reduced. For example, in some embodiments, the transition counts of all destination base stations in the likely neighbour list may be integer divided by a factor, such as two.

Stated differently, if the updated transition count equals or exceeds the upper threshold, the transition counts of all destination base stations in the likely neighbour list may be multiplied by a scaling factor of one half according to equation [1] as follows:

$$TC(\text{new}) = \lfloor TC * sf \rfloor \quad [1]$$

wherein TC (new) is the updated transition count and TC is the old transition count associated with the destination base station and sf is the scaling factor. A scaling factor other than one half may be used; the value of the scaling factor may be chosen as desired by a system designer to meet design goals. Moreover, the scaling factor itself may be adapted to meet changing system needs.

In further embodiments, a lower threshold may be established. Transition counts in the list may be compared to the lower threshold, and any destination eNB that has a transition count less than the lower threshold may be removed from the likely neighbour list for that source base station. For example, in some embodiments, the lower threshold may be set at N (where N is a positive number), and any destination base station that has a transition count less than N may be removed from the list. Such filtering may be performed by the MME 200 from time to time to remove destination base stations to which transitions occur infrequently from the source base station.

In some embodiments, the value of N may be set at one, and the list filtering may be performed whenever the transition counts are divided by two in response to a transition count equaling or exceeding the upper threshold. In that case, any destination base station that previously had a transition count of one would have an updated transition count of zero after the integer division by 2. Such a destination base station would then be removed from the likely neighbour list.

The likely neighbour list for a source base station may be used to generate a paging list that the MME 200 can use to page an idle UE. In particular, the likely neighbour list can be used to generate a paging list that has a desired paging confidence level. For example, when a UE is to be paged shall be reached, the MME 200 may first determine the last base station to which the UE was connected. Because a UE is most likely to be reached by the last base station to which the UE was connected, the MME 200 may first request that base station to page the UE. If that paging attempt fails, the MME can generate a paging list from the likely neighbour list associated with the last base station to which the UE was connected (i.e., the source base station) based on a desired paging confidence level. For each destination base station in the likely neighbour list, a transition probability is generated by dividing the transition count for the destination base station by the total of transition counts of all destination base stations in the likely neighbour list. Because the list is sorted by transition counts in descending order, higher entries on the list will have a higher transition probability. The paging list is then constructed by selecting destination base stations with descending transition probabilities until a cumulative transition probability of the selected destination base stations equals or exceeds the desired paging confidence level.

The transition probability for a given destination base station may be generated according to equation [2] as follows:

$$TOP_i = \left\lfloor 100\left(\frac{TOC_i}{TOC_{tot}}\right)\right\rfloor\% \quad [2]$$

where $TOP_i$ is the transition probability to ith destination base station, $TOC_i$ is the transition count to the ith destination base station from the source base station, and $TOC_{tot}$ is the total number of transitions from the source base station to the destination base stations in the likely neighbour list of the source base station.

For example, assume that the MME 200 desires to page a UE that was last connected to eNB1 with a 95% paging confidence level, and that the UE did not respond to a page by eNB1. In that case, the MME 200 may construct a paging list from the likely neighbour list 502 of eNB1 by selecting destination base stations from the likely neighbour list 502 until the cumulative transition probability of all destination base stations on the paging list equals or exceeds 95%.

In the example shown in FIG. 5, the likely neighbour list 502 of eNB1 includes three entries. The total transition count for the likely neighbour list 502 is 123+142+3=168. The transition probability for eNB3 is floor(100*123/168)=73%, the transition probability for eNB2 is floor(100*42/168)=25%, and the transition probability for eNB4 is floor(100*3/168)=1%. Thus, the MME 200 would construct the paging list by adding eNB3 and eNB2 to the paging list. At that point, the cumulative transition probability of the paging list is equal to 73%+25%=98%, which is greater than the desired paging confidence level of 95%. The MME 200 would then instruct eNB3 and eNB2 to page the UE with a high level of confidence that the UE will be located on the first paging attempt.

If the first paging attempt is unsuccessful, the MME 200 can repeat the operations of constructing a paging list with a higher paging confidence level, e.g., 99%. In this case, the new paging list would include eNB3, eNB2 and eNB4, as the cumulative transition probability would equal 99%. Because paging eNB3 and eNB2 failed in the first paging attempt, those base stations may be excluded from the second paging list (although in some embodiments, paging may be attempted again by those base stations in the second paging attempt).

In some embodiments, if all paging attempts based on the likely neighbour list fail, the MME 200 may instruct all destination base stations in the Tracking Area list of the UE, or all destination base stations in the mobile communication network, to page the UE.

The approach described herein may be implemented in a manner that is extremely lightweight from a resource utilization standpoint, both in terms of training (i.e., generating and updating the likely neighbour lists) and UE location prediction. For example, the complexity of training or inference for one event is O(N) where N is the number of base stations in the system.

Figure 6:
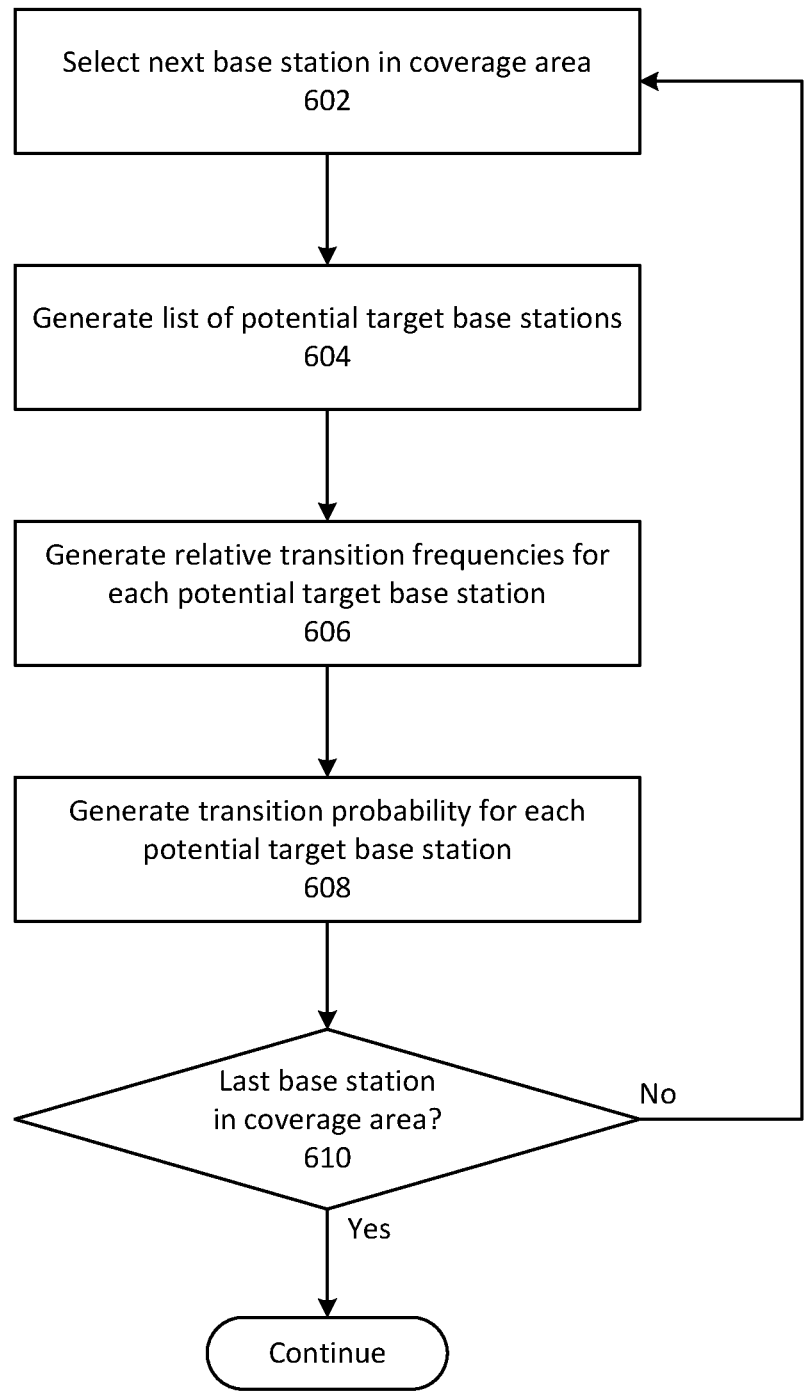
FIGS. 6-8 are flowcharts that illustrate systems/methods according to some embodiments.
Figure 7:
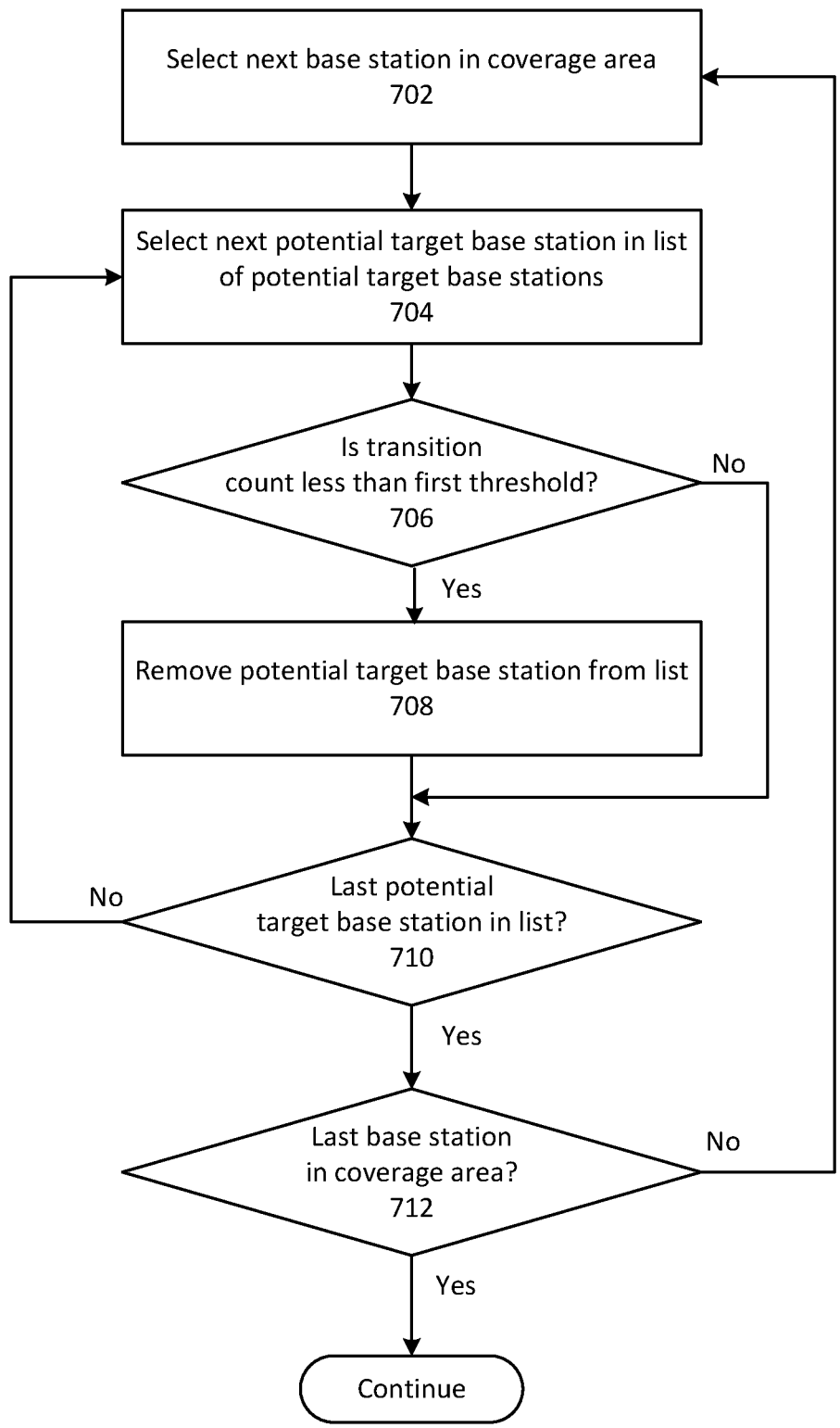
Figure 8:
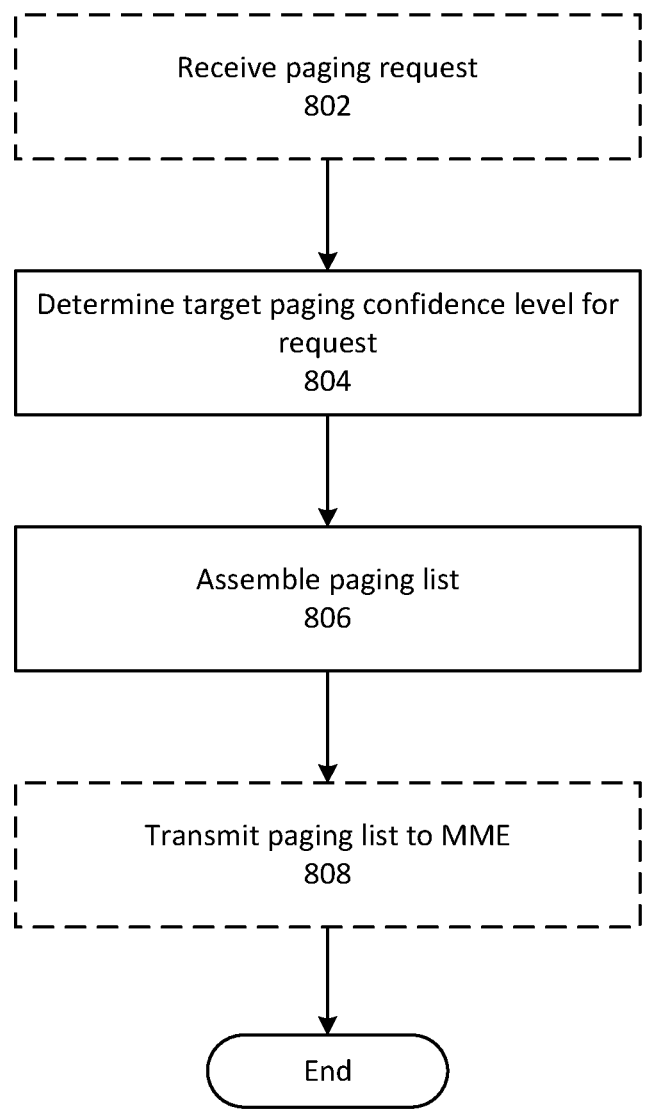

FIGS. 6-8 are flowcharts that illustrate systems/methods according to some embodiments. Referring to FIG. 6, a method of predicting a location of a user equipment, UE, in a mobile communication network having a plurality of base stations serving respective base station coverage areas is illustrated. For each base station in the mobile communication network, the method generates a list of potential target base stations (e.g., the likely neighbour list) for transitions based on a probability of transition to the potential target base station. Accordingly, the method selects a next base station in the coverage area (block 602). For the selected base station, the method generates a list of potential target base stations for the base station (block 604). The list of potential target base stations for the base station (e.g., the likely neighbour list) may include base stations to which a transition from the base station has occurred within a predetermined time period, such as within the last 24 hours, last week, etc.

In constructing the list of potential target base stations, the method generates a transition count for each potential target base station. The transition count includes a count of transitions from the base station to the potential target base station within the predetermined time period.

The method then generates a plurality of relative transition frequencies for the potential target base stations based on the transition counts (block 606). Each of the relative transition frequencies corresponds to one of the potential target base stations and describes a relative frequency of transitions from the base station to the corresponding potential target base station during the predetermined time period. The method generates a transition probability (block 608) for each respective potential target base station based on the relative transition frequency of the potential target base station from the base station.

The method then determines if the selected base station is the last base station in the coverage area, and if not, operations return to block 602 to select the next base station. Otherwise, operations continue.

Further operations are illustrated in the flowchart of FIG. 7. As shown therein, the systems/methods may select a next base station in the coverage area (block 702), and, with the selected base station as the source base station, select the next base station in the list of potential target base stations (e.g., the likely neighbour list) (block 704). The systems/methods determine whether the transition count for the selected potential target base station is less than a first threshold (block 706). If so, the potential target base station is removed from the list of potential target base stations (block 708). Otherwise, operations proceed to block 710 where the systems/methods determine whether the selected potential target base station is the last potential target base station on the list. If not, operations return to block 704 to select the next potential target base station on the list. If the selected potential target base station is the last potential target base station on the list, operations proceed to block 712 where the systems/methods check to see if the selected base station is the last base station in the coverage area. If not, operations return to block 702 to select the next base station in the coverage area. Otherwise, operations continue.

The first threshold may be selected to constrain the list of potential target base stations to those having a transition count greater than or equal to a minimum transition count. In some embodiments, the first threshold may be one.

Comparing transition counts for each of the potential target base stations to the first threshold and removing potential target base stations from the list of potential target base stations in response to the comparison may be performed at predetermined time intervals, e.g., once per hour, once per 12 hours, once per day, etc.

The method may further include removing a potential target base station from the list of potential target base stations when the potential target base station is deactivated from the mobile communication network.

In some embodiments, the method may further include comparing transition counts for each of the potential target base stations to a second threshold, and in response to determining that any of the transition counts for the potential target base stations is greater than the second threshold, multiplying each of the transition counts by a scaling factor. The second threshold may be an upper threshold that is selected to constrain a length of the list of potential target base stations to a predetermined maximum length. In some embodiments, the scaling factor may be one half.

FIG. 8 illustrates operations of a network node for generating a paging list using the list of potential target base stations. In particular, referring to FIG. 8, the node receives a paging request (block 802). The paging request may be generated, for example, by an MME 200 when data is received by the network that is addressed to a UE in idle mode. The network node then determines a target paging confidence level associated with the request (block 804). In some embodiments, the target paging confidence level may be included with the paging request. The systems/methods then generate the paging list as described above based on the last base station to which the UE was connected and the list of potential target base stations for the last base station to which the UE was connected (block 806). A sum of the transition probabilities of the selected potential target base stations may be greater than or equal to the desired paging confidence level.

The node then transmits the paging list to the MME 200 to initiate the paging operation (block 808)

It will be appreciated that one or more of the operations of FIG. 8 may be implemented within the MME 200 itself. Accordingly, the operations of blocks 802 and 808 are shown in broken lines, as they may not be needed when the operations are implemented within the MME 200.

Figure 9A:
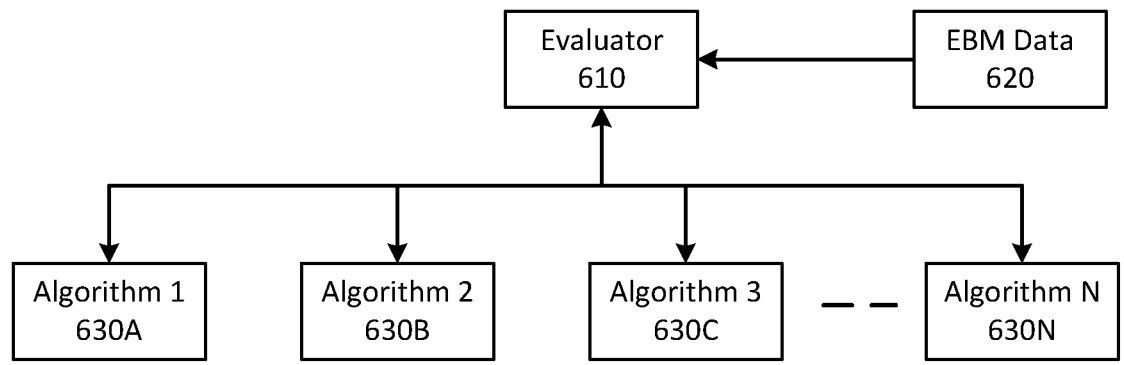
FIGS. 9A and 9B are block diagrams that illustrate operations for evaluating UE location prediction algorithms according to some embodiments.
Figure 9B:
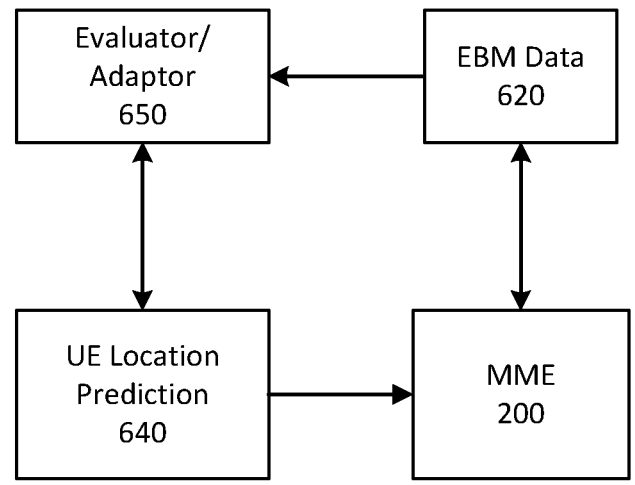

Some embodiments may evaluate different paging list generation models and/or model configurations. In particular, FIGS. 9A and 9B are block diagrams that illustrate operations for evaluating UE location prediction algorithms according to some embodiments. FIG. 9A illustrates an evaluator 610 that evaluates a plurality of UE location prediction algorithms 630A, 630B . . . 630N using stored event-based monitoring (EBM) data 620 that is collected from a mobile communication network. The location prediction algorithms 630A, 630B . . . 630N may be different algorithms or may be differently configured versions of the same algorithm. For example, location prediction algorithm 630A may be a Hidden Markov Model-based model as described above with first values for the upper and lower thresholds, while location prediction algorithm 630B may be a Hidden Markov Model-based model as described above with second values for the upper and lower thresholds. The EBM data 630 may contain data describing handover events and messages sent in the mobile communication system, including the identities of UEs that were paged and the base stations that successfully paged the UEs. Using the EBM data, the evaluator 610 may evaluate how effective a particular model or configuration would be if applied to the actual conditions reflected in the EBM data. In particular embodiments, the evaluator may generate a metric for each evaluated model that represents the efficiency and/or cost of implementing the model. In some embodiments, the metric may include a total number of paging messages needed to locate the UE. In other embodiments, the metric may include a total system bandwidth needed to locate the UE. In still other embodiments, the metric may include a total number of paging attempts needed to locate the UE.

By using evaluator 610, the mobile communication system may determine an optimal or suggested model or model configuration to use for UE location prediction based on network conditions, network usage, time of day, or other parameters.

FIG. 9B illustrates an example of the use of the evaluator to dynamically adapt a smart paging algorithm 630. In the embodiments of FIG. 9B, an evaluator/adaptor unit 650 evaluates a UE location prediction unit 640 that implements a UE location prediction model according to a first model and configuration using EBM data 620 recorded by a mobile communication network node, such as an MME 200. The MME 200 uses the UE location prediction unit 640 to generate paging lists for paging idle UEs in the network as described above.

As new EBM data is continually recorded in response to network activity, the evaluator/adaptor unit 650 evaluates the performance of the location prediction unit relative to other potential models/configurations. If the evaluator/adaptor unit 650 determines that the performance of the evaluator/adaptor unit 650 would be improved by using a different model or configuration, the evaluator/adaptor unit 650 changes the configuration or model employed by the UE location prediction unit 640. For example, the evaluator/adaptor unit 650 may modify the upper and/or lower threshold and/or other parameter utilized by the UE location prediction model that is implemented in the UE location prediction unit 640. When the updated UE location prediction model is implemented, the system collects new EBM data in response to handovers and messages in the network, and the updated UE location prediction model is evaluated based on the new EBM data.

Accordingly, in some embodiments, a method may include providing a set of EBM data describing a plurality of events in the mobile communication network, selecting a threshold value for the first threshold, repeatedly performing operations of analyzing the EBM data to determine a total number of paging messages that would be required to successfully locate all UEs paged in the EBM data using the selected value of the first threshold, and changing the threshold value of the first threshold, and selecting a threshold value that requires a lowest number of paging messages to successfully locate all UEs paged in the EBM data.

Some embodiments may use UE transition information to generate a synthetic geographic map of the mobile communication network that can be used for UE location prediction as well as for other purposes. The actual geographic position (e.g., x-y coordinates) of the base stations in a network may not be known. However, knowledge of the geographic positions of the base stations in a network may be useful for various reasons, such as to be able to draw a map to show the effect of different paging algorithms, and or to show the base stations and their respective tracking areas, for example using colors. (As described in more detail below, a misconfiguration of tracking areas may be detected as a node with an unexpected color). Being able to display a map of base stations may also enable generation of a heat map showing which base stations/base station coverage areas are busy, and/or to assist in debugging paging algorithms and/or to provide a representation of base station topology for use in different machine learning algorithms. Having a map of base station locations can also help in predicting the location of a UE. For example, if a UE transitions from eNB1 to eNB2, such information alone may not convey information about the direction or speed of the UE. However, having knowledge of the location of the base stations involved in the transition as well as information about the time the transitions occurred may allow a rough calculation of the direction and speed of the UE to be made. This information can be valuable when trying to predict the next base station that the UE will connect to.

Figures 10, 11:
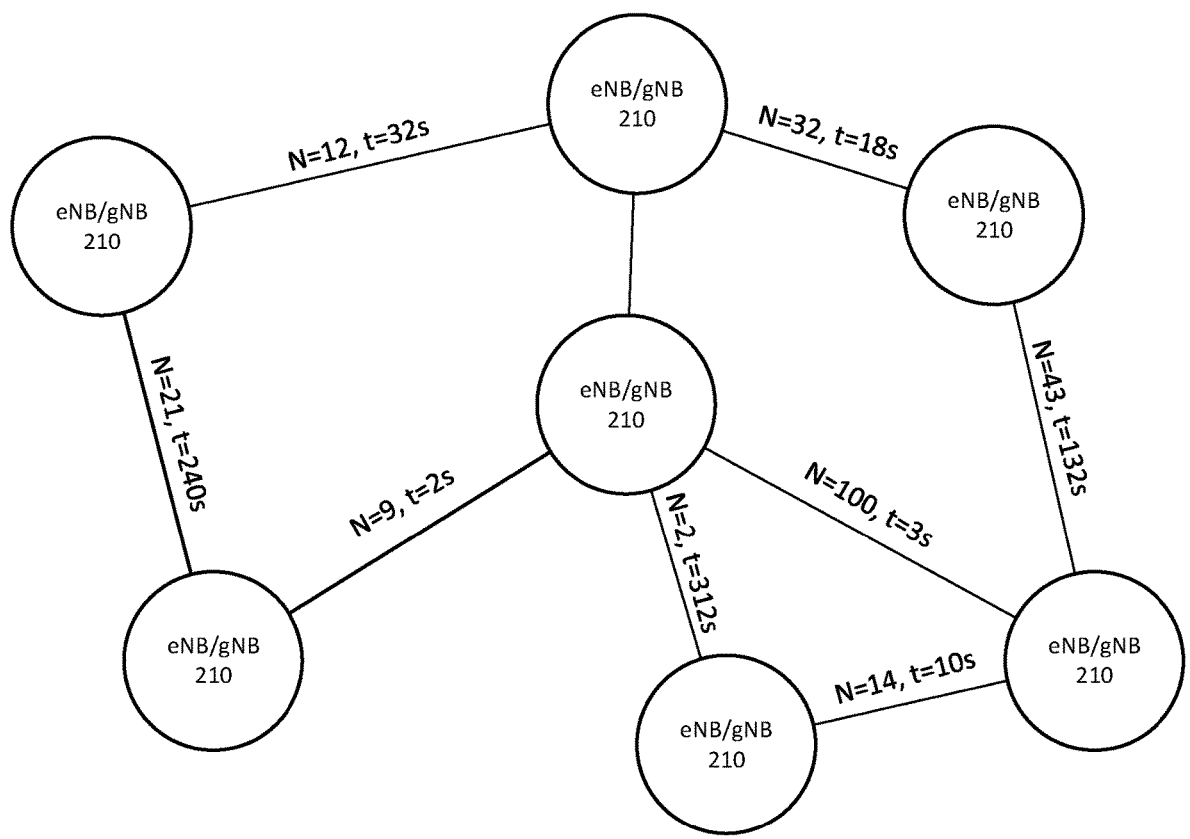
FIG. 10 is a graph that illustrates a technique for generating a paging list in a wireless communication network according to some embodiments.
FIG. 11 is a table that illustrates a technique for generating a paging list in a wireless communication network according to some embodiments.

If the actual geographic coordinates of the base stations are not known, for example, because the available data is anonymized, it is nevertheless possible to create a synthetic map of the base station algorithms. FIG. 10 is a graph and FIG. 11 is a corresponding table that illustrate a technique for generating a synthetic map of a wireless communication network according to some embodiments. To generate the synthetic map of the base station locations, a matrix such as the one shown in FIG. 11 may be constructed using transition timing data that is can be extracted from the EBM data. Each transition event is recorded including the time the transition took place and the base stations involved in the transitions. For explicit handovers, the precise timing of the transition may be included in the EBM data. For other transitions (e.g., implied transitions), the timing of the transition may be inferred from the EBM data. From this information, an average time before transition may be calculated for all transitions involving a given pair of base stations. The matrix of FIG. 11 shows this data for a network including eNB1 to eNB4. For explicit handovers, the average time before transition for a UE may be calculated as the difference between the time the UE was handed over to the source base station from a previous base station to the time the UE was handed over from the source base station to the destination base station. For implicit handovers, the average time before transition may be calculated based on the timestamps of the last message sent to the source base station and the first message sent to the destination base station. As shown in the example of FIG. 11, within the measurement period covered by the EBM data, there were 54 transitions from eNB1 to eNB2, and the average time before transition from eNB1 to eNB2 was 56 seconds.

A graph such as that shown in FIG. 10 may be generated by assigning each base station in the mobile communication system to a node of the graph, and forming an edge between each pair of nodes of the graph corresponding to a pair of base stations that participate in a transition of a UE from one of the pair of base stations to the other during a predetermined time period. An edge weight is assigned to each edge. The edge weight for an edge may be based on an average dwell time prior to transition for each UE that is subject to a transition between the network nodes in the pair of network nodes corresponding to the edge. In some embodiments, the edge weight may be based on a median, maximum or minimum dwell time of UEs involved in transitions.

The nodes of the graph may be arranged according to a geographic distribution based on the edge weights using a synthetic map generation algorithm, such as a T-distributed Stochastic Neighbor Embedding (t-SNE) or a force directed graph drawing algorithm, such as a Kamada-Kawai algorithm, wherein the input to the algorithm is an adjacency matrix with one row for each base station such as the matrix shown in FIG. 11. The output of the algorithm is a set of synthetic x-y coordinates for each node. The nodes of the graph of FIG. 10 may be spatially arranged according to the synthetic x-y coordinates.

The adjacency matrix used for creating the synthetic map may originally be very sparse. That is, most pairs of base stations in a network there will no edge. To reduce the sparseness of the adjacency matrix, some embodiments form synthetic edges based on the transition data. For example, assuming there is no edge from base station A to base station C but that there is an edge from base station A to base station B with time t1 and another edge from base station B to base station C with time t2, a synthetic edge may be created from base station A to base station C with time t1+t2.

Figure 12:
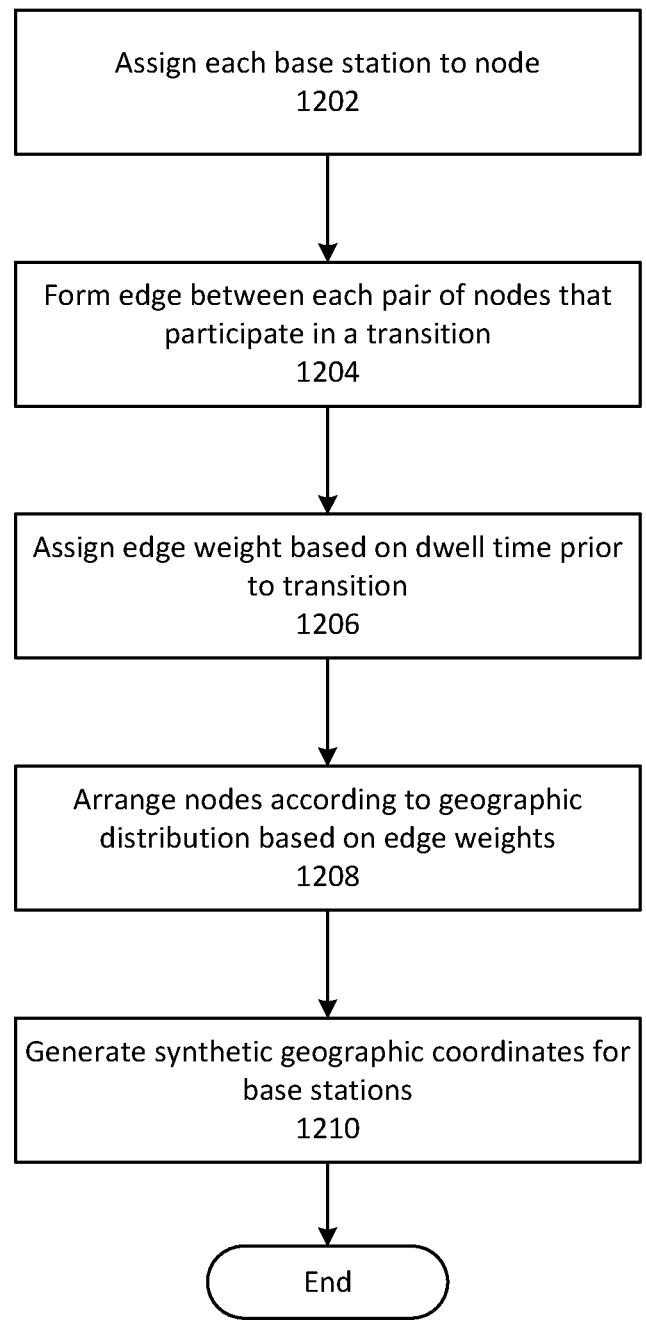
FIG. 12 is a flowchart that illustrates systems/methods according to some embodiments.

FIG. 12 is a flowchart that illustrates systems/methods according to some embodiments. In particular, a method of generating a synthetic geographic map of network nodes in a mobile communication system includes assigning each network node in the mobile communication system to a node of a graph (block 1202), forming an edge between each pair of nodes of the graph corresponding to a pair of base stations that participate in a transition of a UE from one of the pair of network nodes to the other during a predetermined time period (block 1204), and assigning an edge weight to each edge (1206). The edge weight for an edge may be based on a dwell time prior to transition for each UE that is subject to a transition between the network nodes in the pair of network nodes corresponding to the edge. The method further includes arranging the nodes of the graph according to a geographic distribution based on the edge weights (block 1208), and generating synthetic geographic coordinates for the nodes of the graph based on the geographic distribution (block 1210).

In some embodiments, a node weight may be assigned to each node in the graph based on a total number of transitions involving the node in the graph.

The method may further include assigning a color to each node in the graph based on the node weight of the node in the graph, and displaying the graph as a heat map with each node in the graph shown in its assigned color.

The method may further include identifying a node in the graph belonging to a first tracking area that does not have an edge with any other node in the first tracking area, and moving the node in the graph to a second tracking area in which the node has an edge with at least one other node.

The dwell time prior to transition for a UE relative to the pair of network nodes corresponding to the edge includes a time difference between a time when the UE transitioned to one of the pair of network nodes to a time when the UE transitioned from the one of the pair of network nodes to the other of the pair of network nodes.

The edge weight may be based on an average dwell time for all UEs involved in a transition between the pair of network nodes.

A distribution of dwell times of UEs involved in a transition between the pair of network nodes may include a plurality of modes, and wherein the edge weight may be based on a selected one of the plurality of modes of the distribution.

The edge weight may be based on a minimum dwell time for all UEs involved in a transition between the pair of network nodes.

The edge weight may be based on a maximum dwell time for all UEs involved in a transition between the pair of network nodes.

Arranging the nodes of the graph according to a geographic distribution based on the edge weights may include applying a force directed graph drawing algorithm to the nodes based on the edge weights.

Arranging the nodes of the graph according to a geographic distribution based on the edge weights may include applying a Kamada-Kawai algorithm to the nodes based on the edge weights.

Arranging the nodes of the graph according to a geographic distribution based on the edge weights may include applying a T-distributed Stochastic Neighbor Embedding algorithm to the nodes based on the edge weights.

The method may further include obtaining a timestamp associated with a transition of a user equipment, UE, to a coverage area served by a network node, and using the synthetic geographic coordinates of the node of the graph corresponding to the network node to estimate position and/or velocity of the UE.

The method may further include using the estimated position and/or velocity of the UE to predict a second network node to which the UE will transition. For example, a UE that is moving toward the synthetic geographic location of a base station, e.g., based on its transition activity and the synthetic geographic coordinates of the base stations involved in the transitions, may be likely to be handed over to that base station.

Figure 13:
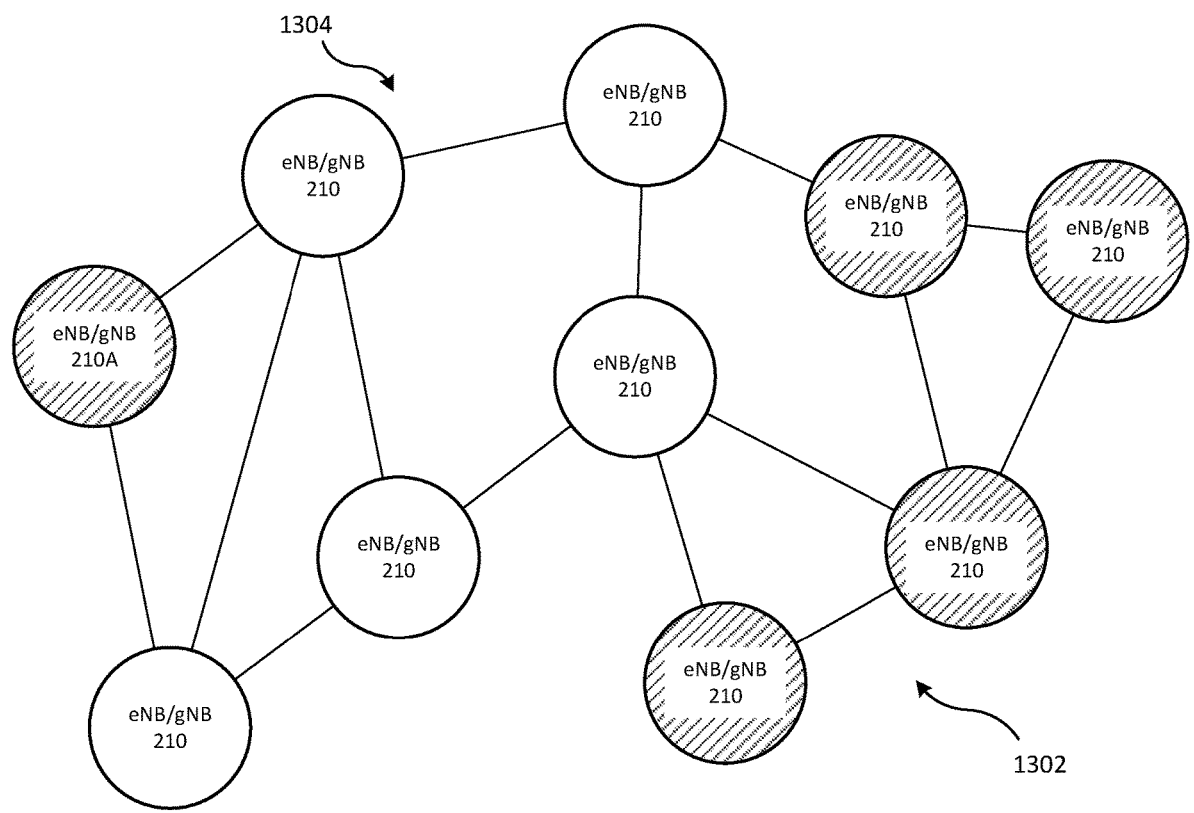
FIG. 13 is a graph that illustrates a synthetic map of nodes in a wireless communication network formed according to some embodiments.

Referring to FIG. 13, the method may further include assigning a color to each node in the graph based on a tracking area to which the base station associated with the node in the graph belongs, and displaying the graph with each node in the graph shown in its assigned color. In particular, FIG. 13 illustrates a coverage area of a mobile communication network including two tracking areas 1302, 1304. Base stations assigned to the first tracking area 1302 are shaded, while base stations assigned to the second tracking area are unshaded.

The synthetic map shown in FIG. 13 may be used to optimize Tracking Area configurations. To reduce paging overhead, the tracking areas should be clustered according to how UEs typically move within the network. As shown in the example of FIG. 13, one of the base stations 210A should be moved from the first tracking area to the second tracking area based on the observation that the base station 210A has edges with base stations in the second tracking area and not the first tracking area 1302. A synthetic map as described herein can also be used to define new tracking areas both in terms of size and base station membership.

Figure 14:
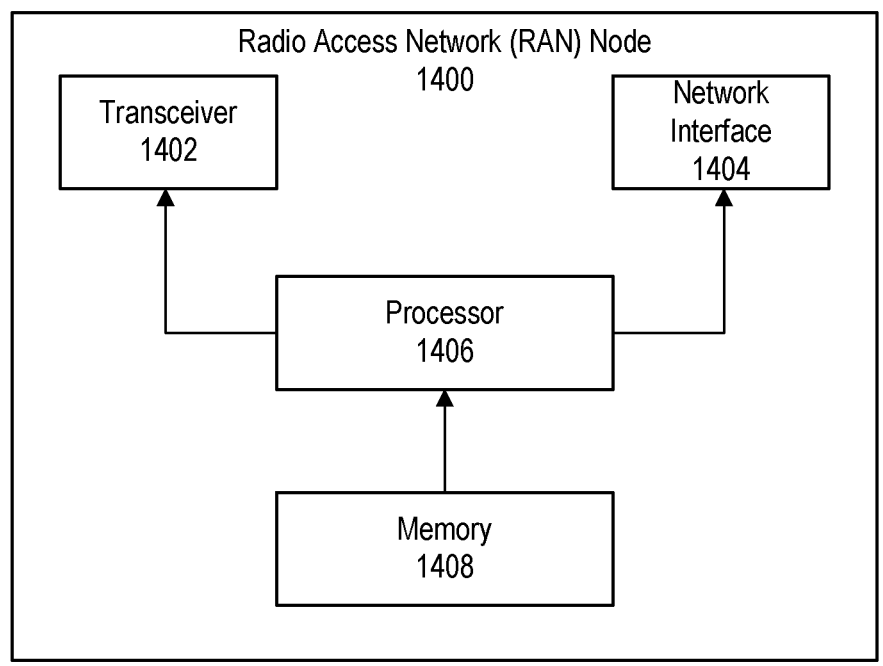
FIG. 14 is a block diagram of a network node configured according to some embodiments.

FIG. 14 depicts an example of a RAN node 1400 (also referred to as a network node) of a mobile communication network configured to provide cellular communication according to embodiments of inventive concepts. The RAN node 1400 may be configured to perform the operations of a base station, eNB, gNB, MME, computer server, evaluator unit, evaluator/adaptor unit or UE location prediction unit as described herein. As shown, RAN node 1400 may include a transceiver circuit 1402 (also referred to as a transceiver) including a transmitter and a receiver configured to provide uplink and downlink radio communications with wireless devices. The RAN node 1400 may include a network interface circuit 1404 (also referred to as a network interface) configured to provide communications with other nodes (e.g., with other base stations and/or core network nodes) of the mobile communication network. The RAN node 1400 may also include a processor circuit 1406 (also referred to as a processor) coupled to the transceiver circuit 1402, and a memory circuit 1408 (also referred to as memory) coupled to the processor circuit 1406. The memory circuit 1408 may include computer readable program code that when executed by the processor circuit 1406 causes the processor circuit to perform operations according to embodiments disclosed herein. According to other embodiments, processor circuit 1406 may be defined to include memory so that a separate memory circuit is not required.

As discussed herein, operations of the RAN node 1400 may be performed by processor circuit 1406, network interface 1404, and/or transceiver 1402. For example, processor circuit 1406 may control transceiver 1402 to transmit downlink communications through transceiver 1402 over a radio interface to one or more UEs and/or to receive uplink communications through transceiver 1402 from one or more UEs over a radio interface. Similarly, processor circuit 1406 may control network interface 1404 to transmit communications through network interface 1404 to one or more other network nodes and/or to receive communications through network interface from one or more other network nodes. Moreover, modules may be stored in memory 1408, and these modules may provide instructions so that when instructions of a module are executed by processor circuit 1406, processor circuit 1406 performs respective operations (e.g., operations discussed herein with respect to example embodiments). In addition, a structure similar to that of FIG. 14 may be used to implement other network nodes, for example, omitting transceiver 1402. Moreover, network nodes discussed herein may be implemented as virtual network nodes.

A network node 1400 in a mobile communication network according to some embodiments includes a processor circuit 1406, a transceiver 1402 coupled to the processor circuit, and a memory 1408 coupled to the processor circuit 1406. The memory 1408 includes machine readable computer program instructions that, when executed by the processor circuit 1406, cause the network node 200 to perform operations of, for each base station in the mobile communication network, generating (604) a list of potential target base stations for the base station, the list of potential target base stations for the base station including base stations to which a transition from the base station occurs within a predetermined time period, wherein generating the list of potential target base stations includes generating a transition count for each potential target base station, the transition count including a count of transitions from the base station to the potential target base station within the predetermined time period, generating (606) a plurality of relative transition frequencies based on the transition counts, each of the relative transition frequencies corresponding to one of the potential target base stations and describing a relative frequency of transitions from the base station to the corresponding potential target base station during the predetermined time period, generating (608) a transition probability for each respective potential target base station based on the relative transition frequency of the potential target base station from the base station, comparing (706) transition counts for each of the potential target base stations to a first threshold, and in response to the transition count for one of the potential target base stations being less than the first threshold, removing (708) the one of the potential target base stations from the list of potential target base stations for the base station.

A computer server 1400 according to some embodiments includes a processor circuit 1406, and a memory 1408 coupled to the processor circuit 1406, wherein the memory 1408 includes machine readable computer program instructions that, when executed by the processor circuit 1406, cause the computer server 1400 to perform operations of assigning (1202) each network node in the mobile communication system to a node of a graph, forming (1204) an edge between each pair of nodes of the graph corresponding to a pair of base stations that participate in a transition of a user equipment, UE, from one of the pair of network nodes to the other of the pair of network nodes during a predetermined time period, assigning (1206) an edge weight to each edge, wherein the edge weight for an edge is based on a dwell time prior to transition for each UE that is subject to a transition between the network nodes in the pair of network nodes corresponding to the edge, arranging (1208) the nodes of the graph according to a geographic distribution based on the edge weights, and generating (1210) synthetic geographic coordinates for the nodes of the graph based on the geographic distribution.

Further Definitions And Embodiments

As will be appreciated by one of skill in the art, the present inventive concepts may be embodied as a method, data processing system, and/or computer program product. Accordingly, the present inventive concepts may take the form of an entirely hardware embodiment, an entirely software embodiment or an embodiment combining software and hardware aspects all generally referred to herein as a "circuit" or "module." Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

The embodiments described herein provide useful physical machines and particularly configured computer hardware arrangements of computing devices, servers, electronic gaming terminals, processors, memory, networks, for example. Components of the computer may include, but are not limited to, a processing unit including a processor circuit, such as a programmable microprocessor or microcontroller, a system memory, and a system bus that couples various system components including the system memory to the processing unit.

The processor circuit may be a multi-core processor including two or more independent processing units. Each of the cores in the processor circuit may support multi-threading operations, i.e., may have the capability to execute multiple processes or threads concurrently. Additionally, the processor circuit may have an on-board memory cache. An example of a suitable multi-core, multithreaded processor circuit is an Intel® Core i7-7920HQ processor, which has four cores that support eight threads each and has an 8 MB on-board cache. In general, the processor circuit may, for example, include any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processing unit. The system memory may store an operating system, application programs, other program modules, and program data. As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The invention claimed is:

1. A method performed by a network node for paging a user equipment, UE, and/or for instructing potential target base stations for a base station to page the UE in a mobile communication network having a plurality of base stations serving respective base station coverage areas, the method comprising:

for each base station in the mobile communication network:
generating a list of the potential target base stations for instructing to page the UE, the list of potential target base stations comprising base stations to which a UE transition from the base station occurs within a predetermined time period, wherein generating the list of potential target base stations comprises generating a transition count for each potential target base station, the transition count comprising a count of transitions from the base station to the potential target base station within the predetermined time period;
determining a desired paging confidence level;
assembling a paging list by selecting a plurality of potential target base stations from the list of potential target base stations based on the desired paging confidence level and transition probabilities for each of the potential target base stations in the list of potential target base stations for a last known base station; and
transmitting a message to at least one of the potential target base stations of the paging list that includes instructions for the at least one of the potential target base stations to transmit a paging message to the UE.

2. The method of claim 1, further comprising:
providing a set of event-based monitoring, EBM, data describing a plurality of events in the mobile communication network;

selecting a threshold value for a first threshold;
repeatedly performing operations of:
analyzing the EBM data to determine a total number of paging messages that would be required to successfully locate all UEs paged in the EBM data using the selected threshold value of the first threshold; and
changing the threshold value of the first threshold; and
selecting a threshold value that requires a lowest number of paging messages to successfully locate all UEs paged in the EBM data.

3. The method of claim 1, wherein a sum of the transition probabilities of the selected potential target base stations is greater than or equal to the desired paging confidence level.

4. The method of claim 1, wherein the paging list is assembled by selecting the plurality of potential target based stations with descending transition probabilities until a cumulative transition probability of the selected target base station equals or exceeds the desired paging confidence level.

5. The method of claim 1, further comprising:
removing a first potential target base station from the list of potential target base stations for each base station when the first potential target base station is deactivated from the mobile communication network.

6. The method of claim 1, wherein the list of the potential target base stations for the base station is sorted in descending order according to the transition count.

7. The method of claim 1, wherein the method is triggered by an initial paging attempt being unsuccessful, wherein the initial paging request comprises:
sending a paging request to a base station to which the UE previously was connected.

8. The method of claim 1, further comprising:
comparing transition counts for each of the potential target base stations to a first threshold; and
in response to the transition count for one of the potential target base stations being less than the first threshold, removing the one of the potential target base stations from the list of potential target base stations for the base station.

9. The method of claim 8, wherein comparing transition counts for each of the potential target base stations to the first threshold and removing potential target base stations from the list of potential target base stations in response to the comparison being performed at predetermined time intervals.

10. A network node, comprising:
a processor circuit;
a network interface coupled to the processor circuit;
and a memory coupled to the processing circuit, wherein the memory comprises machine readable computer program instructions that, when executed by the processor circuit, cause the network node to perform operations of for each base station in a mobile communication network:
generating a list of the potential target base stations for instructing to page a UE, the list of potential target base stations comprising base stations to which a UE transition from a source base station occurs within a predetermined time period, wherein generating the list of potential target base stations comprises generating a transition count for each potential target base station, the transition count comprising a count of transitions from the base station to the potential target base station within the predetermined time period;
determining a desired paging confidence level;
assembling a paging list by selecting a plurality of potential target base stations from the list of potential target base stations based on the desired paging confidence level and transition probabilities for each of the potential target base stations in the list of potential target base stations for a last known base station; and
transmitting a paging message to at least one of the potential target base stations of the paging list that includes instructions for the at least one of the potential target base stations to transmit another paging message to the UE.

11. The network node of claim 10, wherein the network node comprises a mobility management entity, MME.

12. The network node of claim 10, the operations further comprising:
providing a set of event-based monitoring, EBM, data describing a plurality of events in the mobile communication network;
selecting a threshold value for a first threshold;
repeatedly performing operations of:
analyzing the EBM data to determine a total number of paging messages that would be required to successfully locate all UEs paged in the EBM data using the selected value of the first threshold;
and changing the threshold value of the first threshold;
and selecting a threshold value that requires a lowest number of paging messages to successfully locate all UEs paged in the EBM data.

13. The network node of claim 10, wherein a sum of the transition probabilities of the selected potential target base stations is greater than or equal to the desired paging confidence level.

14. The network node of claim 10, wherein the paging list is assembled by selecting the plurality of potential target based stations with descending transition probabilities until a cumulative transition probability of the selected target base station equals or exceeds the desired paging confidence level.

15. The network node of claim 10, wherein the list of the potential target base stations for the base station is sorted in descending order according to the transition count.

16. The network node of claim 10, further comprising:
comparing transition counts for each of the potential target base stations to a first threshold; and
in response to the transition count for one of the potential target base stations being less than the first threshold, removing the one of the potential target base stations from the list of potential target base stations for the base station.

17. The network node of claim 16, the operations further comprising:
removing a first potential target base station from the list of potential target base stations for each base station when the first potential target base station is deactivated from the mobile communication network.

18. The network node of claim 16, wherein comparing transition counts for each of the potential target base stations to the first threshold and removing potential target base stations from the list of potential target base stations in response to the comparison being performed at predetermined time intervals.

* * * * *